No. 628,003. Patented July 4, 1899.
R. HEARNS.
DETACHABLE CAR FENDER.
(Application filed July 23, 1898.)
(No Model.)
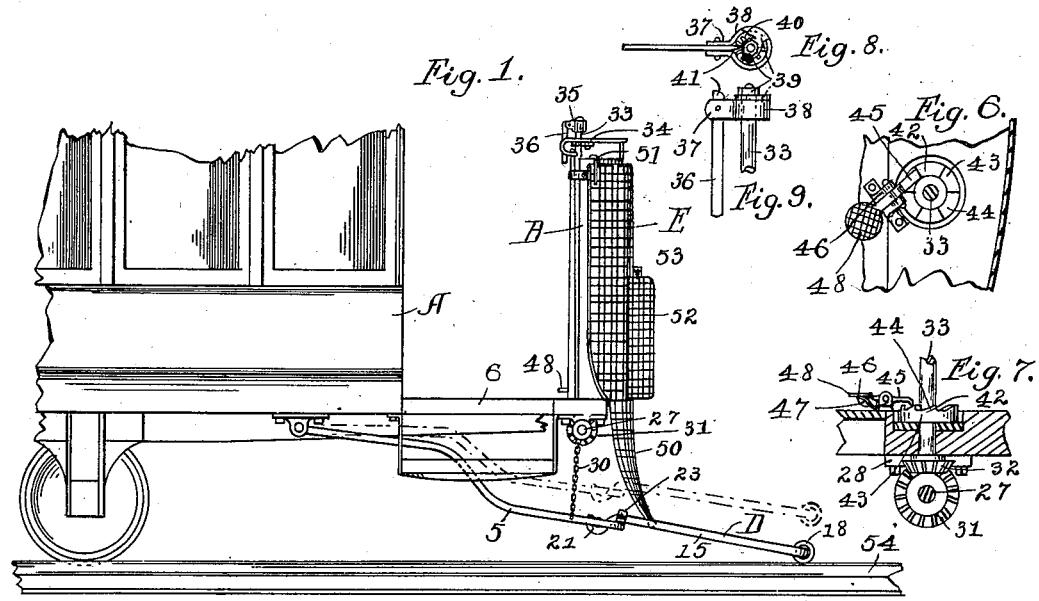
Witnesses:
L. E. Wickman
F. M. Johnson
Inventor:
Robert Hearns.
per:
H. S. Bradbury
Attorney.

UNITED STATES PATENT OFFICE.

ROBERT HEARNS, OF ST. PAUL, MINNESOTA.

DETACHABLE CAR-FENDER.

SPECIFICATION forming part of Letters Patent No. 628,003, dated July 4, 1899.

Application filed July 23, 1898. Serial No. 686,709. (No model.)

*To all whom it may concern:*

Be it known that I, ROBERT HEARNS, a citizen of the United States of America, and a resident of St. Paul, Minnesota, have invented certain new and useful Improvements in Detachable Car-Fenders, of which the following is a specification.

My invention relates to improvements in detachable car-fenders for use upon ordinary rapid-transit street-cars or other vehicles in which it is desired to prevent persons or objects from being run over by the wheels of the vehicle.

It is found desirable to have the street-car fender detachable for reversing to opposite ends of cars or vehicles or interchangeable therewith and to have such done quickly and without the use of tools; also, to have said fender readily adjustable, so that it may be raised and lowered into regulated height from the rails when desired; and to this end it consists more specifically as follows:

In the accompanying drawings, forming part of this specification, Figure 1 is a detail side elevation of a street-car, showing my fender attached thereto. Fig. 2 is a plan view of the same, looking toward the under side of the car. Fig. 3 is a detail view of the upper portion of the dash of the car, showing the mode of hanging the padding thereon used in connection with my invention. Figs. 4 and 5 are detail views showing the mode of attaching my fender upon the supporting-frame of my device. Figs. 6 and 7 are detail views showing the ratchet construction for retaining the fender when raised, and Figs. 8 and 9 are detail views of the handle for operating my fender into adjusted positions.

In the drawings, A represents a street-car of ordinary construction, having the dash B and framework C. Upon the under side of the framework C, which is composed of beams 2, is bolted the clips 3, to which is attached and journaled by means of bolts 4 the hanger 5, which passes forward from the body of the car and under the platform 6, sloping down toward the track, with its end about ten inches therefrom. The hanger 5 is composed of a single iron shaped with the transverse arm 7 and is bolted to reinforcing-iron 8. Upon the arms 9 and 10 thereof are fastened the supporting-bolts 11 and 12, by means of nuts 13. These bolts are positioned closely adjacent the transverse bar 7 and are provided with heads 14, between which and the arms 9 and 10 the arms 15 and 16 of the fender D are hooked, the arms 15 and 16 passing, respectively, over the cross-arm 7, upon which they rest.

The fender D is composed of the framework, which is made of arms 15 and 16, of iron piping or other suitable material, and is shaped with the transverse cross-arm 17 upon its forward end, which is provided with rollers 18 and 19 and cushioning material 20, which surrounds the piping on said arm 17. The rollers 18 and 19 are journaled upon said arm 17 and are positioned so as to contact with the track-rails 54 when the fender is lowered. Upon the rearward ends of the arms 15 and 16 are formed the hooks 21 and 22, which pass beneath the bolts 11 and 12.

To fasten the fender upon the supporting-frame is preferably provided the clips 23, which are hinged to the framework by means of clips 24, bolt 25, and thumb-screw 26, by the loosening of which thumb-screw on each of the clips the fender D may be removed from the supporting-frame of the car. To raise and lower the supporting-frame of the fender is provided the shaft 27, which is journaled upon the clips 28, which are bolted to the bottom of the framework of the platform 6. Upon either end of said shaft 27 are the collars 29, between which and the clips 28 are fastened the chains 30, which connect to the arms 9 and 10 of the supporting-frame and are adapted by turning the shaft to wind or unwind upon the same, and thereby raise and lower the supporting-frame. To operate said shaft, I preferably provide the bevel-gear 31, which is connected to said shaft and meshes with bevel-pinion 32, which is mounted upon the lower end of standard 33, below the car-frame. The standard 33 extends above the dash B and is journaled upon the clip 34, which is bolted to said dash. To conveniently operate said standard and its connected mechanism, which raises and lowers the frame and fender, I preferably provide the handle 35, which is composed of grip 36, journaled upon clip 37 of collar 38, which is held upon the standard 33 by means of nut and washer 39. The collar surrounds the teeth 40, which are formed upon the upper end of the standard, and the grip 30 is provided with engaging tooth 41, which engages with the teeth 40 of the standard when raised into horizontal position, as shown in Fig. 8. It will thus be seen the grip 36, when in horizontal position and held so by the grip and turned, either raises or lowers the fender and the before-described mechanism, and when released is adapted to automatically turn into normal position, as shown in Figs. 1 and 9, thereby freeing said standard to turn. To retain the fender in raised position, I preferably provide the ratchet 42, which is composed of circular plate 43, provided with ratchet-teeth 44, which are adapted to be engaged by foot-pawl 45. The foot-pawl 45 is journaled upon the clips 46, which are fastened to the floor of the platform. The pawl is forced into engagement with the ratchet-plate by means of the spring 47, which holds it in normal position and is released from engagement with said ratchet-plate by pressing the foot upon the plate 48. It will thus be seen the fender may be dropped into position for catching an object upon the track by releasing the pawl 45 from engagement with the plate 43 by pressure with the foot upon the plate 48. This ratchet mechanism is located with the standard and its operating-handle in convenient position for use by the motorman.

The fender is filled within its outer framework with the intermeshing material 49, which is composed of rope, canvas, or any suitable material, and is preferably provided with the life-guard shield 50, which extends upward and connects the framework with the fender D and with the padding E. The life-guard is composed of any flexible material, such as canvas. The padding E is adapted to cover the entire front of the dash D and is supported thereon by means of hooks 51, which pass over the top of said dash. It is obvious the padding may be constructed of canvas strips or built up of springs and covering material, as desired, and which is of ordinary construction. To cover the car-coupler, I provide the shield 52, which constitutes a supplemental padding-cushion upon the front of the dash. This cover is fastened to the main padding E by means of hooks 53, and may be removed when so desired for coupling the car or other obvious reasons.

In the use of my improved device when the car or vehicle is in ordinary service the fender is raised, as shown in Fig. 1, its lower end being a few inches from the track. When the motorman or driver sees an object upon the track with which the car is liable to contact, the foot-pawl 45 is operated by pressing the foot upon the foot-plate 48, which releases and allows the standard and its connected mechanism for supporting the framework to operate. The weight of the fender causes the same and its supporting-frame to descend into the position shown in full lines in Fig. 1. The rollers 18 and 19 bear upon the rails and support the lower end of the fender in close proximity to the track. The object upon the track is thus scooped upon the fender, and if of a character to fall backward upon the dash it strikes the padding and meets with sufficient cushion to prevent damage thereto. The life-guard 50 prevents the object from passing over or from the fender and beneath the car.

For removing my improved device from the car the clasps 23, which are conveniently located on either side of the fender, so as to clamp the arms 15 and 16 thereof to the supporting-frame 5, are released from the framework by removing the thumb-screws 26 and throwing the clasps back. The lower end of the fender is then thrown up and unhooked from the frame 5. The cushion E is removed from the dash D by unhooking the same therefrom. It is thus seen the entire fender and its cushion and life-guard may be easily changed to another vehicle.

Having thus described my invention, what I desire to secure by Letters Patent is—

1. In a device of the class described the combination of the cushioning device supported on the dash of the car, by means of hangers and composed of cushioning material which covers the front face of the dash; the life-guard, formed upon its lower edge and extending below the same; the fender which inclines toward the ground, provided with rollers which contact with the rails and thereby support said fender in close proximity to the same, when in lowered position, and hooked upon and substantially supported by the supporting-frame; the supporting-frame consisting of arms which are journaled to the under side of the car and which are provided with a transverse arm, which forms substantially part thereof, said framework being supported in adjusted position at its outer end, by means of depending chains which connect with the operating device for raising and lowering said fender into regulated position relative to the rails; the operating device consisting of a hand-crank, and operating means for winding or unwinding the chain which thereby raises or lowers the fender and its support; and the life-guard depending from the lower edge of said padding, which connects to the fender, and substantially fills the opening between said cushion and fender, all as described.

2. The combination in a device of the class described of a supporting-frame journaled on the car-body and adjustably supported by means of chains fastened to a shaft, having a collapsible handle and ratchet connected thereto by means of which the frame is raised and lowered and supported in adjusted position; the fender removably fastened to said frame and supported thereon; the padding which is removably hung upon the dash of the car by means of hooks, so as to substantially cover the face thereof; and the flexible life-guard, which is formed substantially integral with said padding and having its lower end fastened to the fender so that the fender may be raised and lowered and removable from the car, substantially as described.

3. In a device of the class described the combination of the supporting-frame, journaled upon the car and provided with supporting means for raising and lowering said frame, consisting of a shaft to which is fastened and connected chains, a bevel-gear mounted upon said shaft which meshes with the bevel-pinion mounted upon the standard which is provided with an operating-handle, said handle being adapted to engage with said standard when in horizontal position and disengage itself therefrom when in normal position, being suitably journaled upon a supporting-collar, journaled upon said standard and provided with the engaging teeth, which engage with teeth formed upon the upper end of said standard; the fender which is hooked to said supporting-frame and held thereon by means of clasps which are hinged upon said frame; the rolls upon the fender for supporting the same in close proximity to the track when in lowered position, the life-guard connected to the fender and padding which is hung upon the dash of the car, by means of hooks, and substantially covers the front of said dash, and provided with supplemental padding, which is hung upon the main padding by means of a hook and which is adapted to cover the coupling of the car and be removed therefrom when so desired, substantially as described.

4. The combination in a device of the class described of the fender D removably supported and held normally at an inclined angle to the ground; the hanger-frame 5 for supporting said fender in position, journaled to the framework of the car and having supporting-chains 30 which are fastened to the shaft 27; said shaft being journaled to the framework of the car and having supporting means, consisting of the gearing and the handle 36, by the turning of which the fender and said hanger-frame are raised and lowered; a ratchet formed on said rod 33 and a pawl 45 by which said fender is retained in raised position; and the padding E removably fastened to the dash of the car and connected to said fender all as described.

In testimony whereof I affix my signature, in presence of two witnesses, this 12th day of July, 1898.

ROBERT HEARNS.

Witnesses:
  LYDA E. WICKMAN,
  F. G. BRADBURY.